May 7, 1929.  H. SPEIRS  1,711,815

BEATER FOR THRASHING MACHINES

Filed March 31, 1928

INVENTOR,

Henry Speirs

Patented May 7, 1929.

1,711,815

UNITED STATES PATENT OFFICE.

HENRY SPEIRS, OF BRAMPTON, ONTARIO, CANADA.

BEATER FOR THRASHING MACHINES.

Application filed March 31, 1928. Serial No. 266,281.

The invention relates to improvements in beaters for thrashing machines as described in the present specification and shown in the accompanying drawings that form a part of the same.

The main object of the invention is to provide a heater which will effectually separate from the stalks all of the heads of grain which the cylinder fails to dislodge, without injury to the grain.

A further object is to provide a beater so constructed that it will not readily become clogged and so interfere with the operation of the cylinder or the movable rake.

And generally the objects of the invention are to provide a thoroughly efficient beater which will be inexpensive to construct and durable.

Heretofore, in the construction of beaters it has been usual to employ blades in the form of plates of equal thickness throughout set around a central hub, or shaft, but this construction has been found to have disadvantages which make its use undesirable. One objection is that owing to each surface of each blade being at right angles to the shaft a pocket is formed between each pair of blades into which the straw packs and seriously impedes the operation of the machine. Another objection is that the relatively sharp edges of the blades injure the heads of grain in the process of separation.

The present invention differs from known devices in that the blades are tapered slightly to their outer edges, which are rounded, and the spaces between said blades adjacent to their meeting edges are filled in to present concaved faces in continuity with the adjacent surfaces of said blades.

The invention consists in the novel features of construction, arrangements and combinations described in the present specification and more particularly pointed out in the claims for novelty following.

Figure 1:
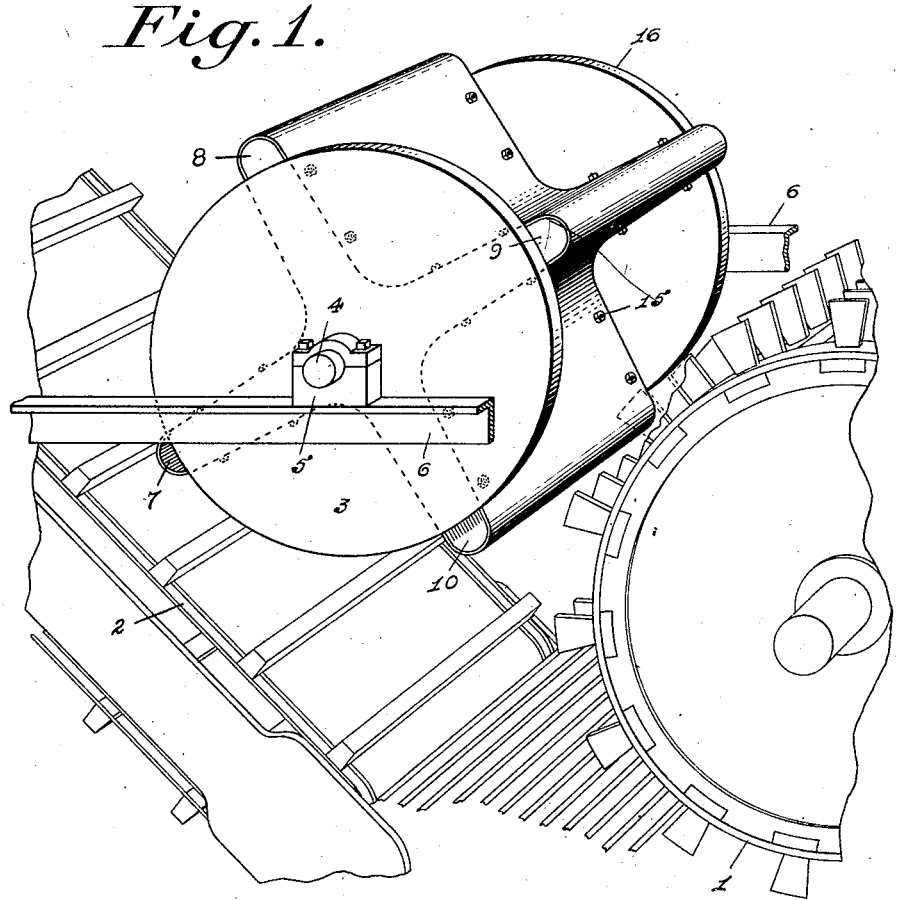

In the drawings Figure 1 is a perspective view of a portion of a thrashing machine showing the beater in position thereon.

Figure 2:
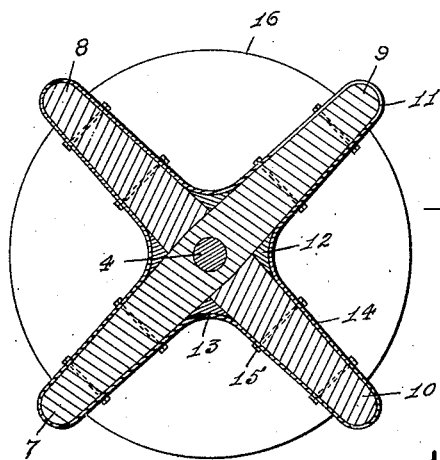

Figure 2 is a cross sectional view through the beater.

Like numerals of reference indicate corresponding parts in the various figures.

Referring to the drawings, 1 represents the cylinder by means of which the heads of grain are knocked from the stalks and 2 represents the travelling rake by means of which said stalks are conveyed from the cylinder.

The beater 3 is positioned between the cylinder 1 and the rake 2 so as to strike the straw as it leaves the cylinder and knock therefrom any heads of grain which the cylinder has failed to dislodge, and also to aid the rake in clearing the straw from the cylinder, said beater being mounted on a shaft 4 which at opposite ends of the beater is journalled in bearings 5 mounted on arms 6 supported from the frame of the machine.

The beater 3 preferably comprises four blades 7, 8, 9 and 10 positioned at equal distances from one another around the shaft 4, two of the opposing blades, such as those indicated by the numerals 7 and 9, preferably being integral and formed by extending the shaft 4 longitudinally through the transverse centre of the material of which the said blades are formed and the remaining blades 8 and 10 being formed of separate pieces of material suitably secured to opposite sides of the material of which the blades 7 and 9 are formed.

The various blades are tapered slightly towards their outer edges and said edges are rounded as at 11.

The right angle corners, or pockets, formed by the meeting edges of adjacent blades are preferably filled in by means of small blocks, or packing elements, 12 having their faces concaved, as at 13, in continuity with the corresponding faces of the blades.

The blades are completely covered by a sheet 14 of metal secured to said blades by means of bolts 15 extended therethrough at intervals.

It is of course understood that the blocks 12 may be dispensed with and the metal covering 14 extended across the corners formed by the meeting blades if desired but the inclusion of the blocks is preferable in view of the solidity which they afford.

16 are discs positioned at the ends of the blades, said discs being slightly less in diameter than the combined length of opposing blades so that said blades will project past said discs.

In the operation of the invention the axle 4 is rotated through its connection with the source of power, which connection is not shown in the drawings, and as the beater rotates the rounded edges of the blades strike the grain as it emerges from beneath the cylinder 1 and knocks the heads from the stalks and also gives the straw added impetus in its ascent on the conveyor 2.

As the beater presents a smooth outer face throughout without any pockets in which the straw might become packed the efficiency of the whole thrashing machine is enhanced.

What I claim is:—

1. A beater for thrashing machines comprising a shaft, a plurality of tapered blades fixedly mounted on said shaft, and a sheet of metal covering said blades, said sheet being drawn across the corners formed at the junction of adjacent blades.

2. A beater for thrashing machines comprising a shaft, a plurality of tapered blades fixedly mounted on said shaft, the edges of said blades being rounded, packing blocks inserted between adjacent blades at the junction thereof, the faces of said blocks being concaved in continuity with the adjacent faces of said blades, and a sheet metal covering secured over said blades.

3. A beater for thrashing machines comprising a shaft, a plurality of tapered blades mounted on said shaft, circular discs secured over the ends of said blades, said discs being of lesser diameter than the combined length of two opposing blades, concaved blocks positioned between adjacent blades at the junction thereof, and a sheet metal covering extending over said blades and said blocks.

4. A beater for thrashing machines comprising a shaft, a pair of discs mounted on said shaft in spaced relation to one another, a plurality of tapered blades mounted on said shaft at right angles to the axis thereof between said discs, said blades projecting past said discs and the projecting portions thereof being rounded, and a sheet metal covering for said blades, said covering being extended across the respective corners formed at the junction of adjacent blades.

5. A beater for thrashing machines comprising a shaft, a plurality of blades fixedly mounted on said shaft at right angles thereto, packing elements filling the corners formed at the junction of adjacent blades, and presenting concaved faces, a sheet of metal extending circumferentially of said beater and following the contour of said blades and said packing elements, and bolts securing said sheet of metal to the respective blades.

Signed at Toronto, Ont., this 20th day of February, 1928.

HENRY SPEIRS.